United States Patent [19]

Mutolo

[11] Patent Number: 4,789,249

[45] Date of Patent: Dec. 6, 1988

[54] LINEAR MOTION BEARING AND SHAFTS

[75] Inventor: Francis V. Mutolo, Morrisville, Pa.

[73] Assignee: Thomson Industries, Inc., Manhasset, N.Y.

[21] Appl. No.: 58,694

[22] Filed: Jun. 4, 1987

Related U.S. Application Data

[63] Continuation of Ser. No. 733,772, May 14, 1985, abandoned.

[51] Int. Cl.$^4$ ............................................. F16C 29/06
[52] U.S. Cl. ..................................................... 384/43
[58] Field of Search ........................ 384/43, 44, 45, 18; 464/168

[56] References Cited

U.S. PATENT DOCUMENTS

| | | | |
|---|---|---|---|
| 1,673,163 | 6/1928 | Schmelzkopf | 82/32 |
| 2,049,394 | 7/1936 | Johnson | 308/5 |
| 2,654,640 | 10/1953 | Bullard | 308/3 |
| 3,904,254 | 9/1975 | Hagen et al. | 384/18 |
| 4,120,538 | 10/1978 | Headen | 308/6 C |
| 4,128,279 | 12/1978 | Ernst et al. | 308/6 C |
| 4,611,861 | 9/1986 | Haruyama | 384/18 |

OTHER PUBLICATIONS

Lintech Products brochure—copyright 1983.

Primary Examiner—Lenard A. Footland
Attorney, Agent, or Firm—Morgan & Finnegan

[57] ABSTRACT

A linear motion bearing assembly is provided having a pair of aligned shafts which are fastened together, and a pair of bearings which either roll or slide on the aligned shafts. The shafts may be fastened together along a joint formed on their outer surfaces or they may be fastened together with a spacer disposed between the shafts.

23 Claims, 5 Drawing Sheets

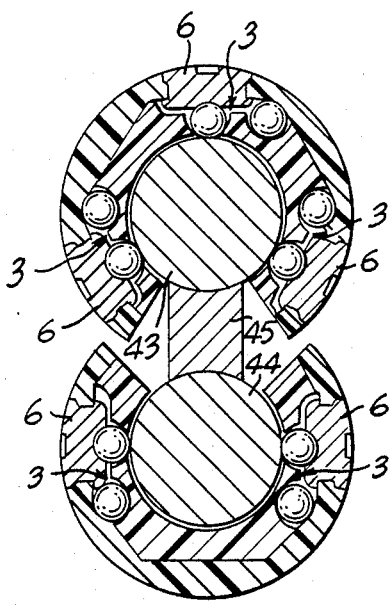
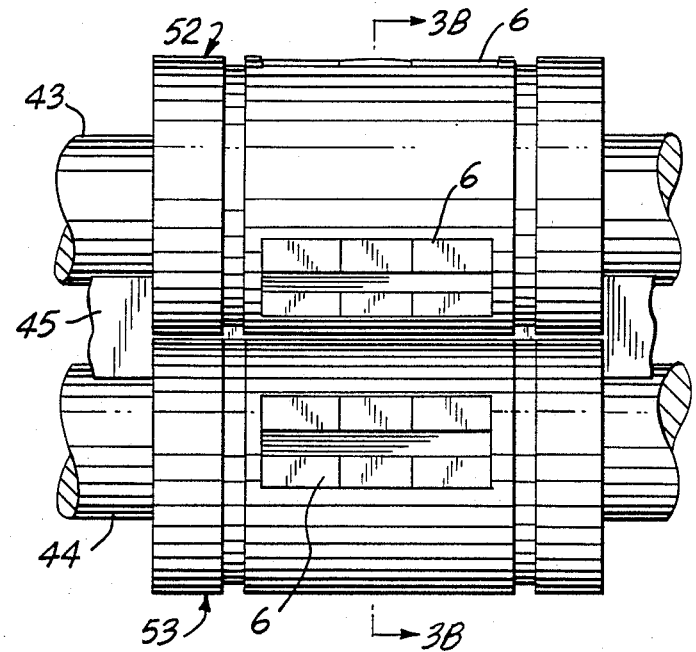
FIG. 3B          FIG. 3A
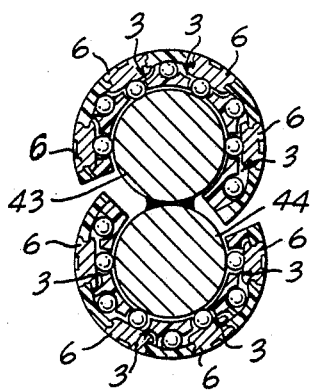
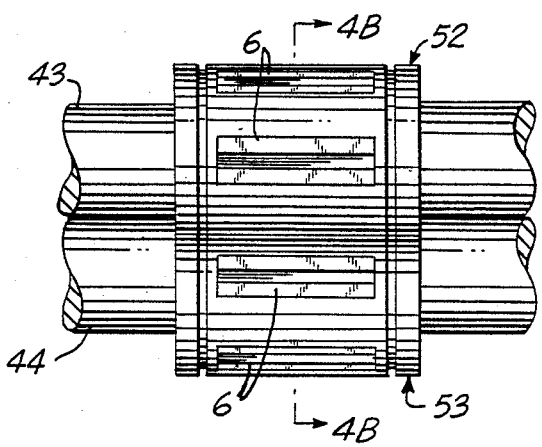
FIG. 4B          FIG. 4A

LINEAR MOTION BEARING AND SHAFTS

This is a continuation of co-pending application Ser. No. 733,772, filed May 14, 1985, now abandoned.

BACKGROUND OF THE INVENTION

1. Field of the Invention

The present invention relates generally to anti-friction bearings for linear motion and more specifically to linear motion ball bearings disposed upon a pair of pre-aligned shafts which are coupled together.

2. Description of the Prior Art

Representative examples of linear motion ball bearings are described in U.S. Pat. Nos. 2,628,135, 3,545,826 and 4,334,716 which are assigned to the assignee of the present invention. Illustratively, U.S. Pat. No. 3,545,826 describes a self-aligning linear motion ball bearing in which a ball retainer having oblong raceways is disposed around a shaft. The oblong raceways include load bearing and load free portions and are substantially filled with balls. A load bearing plate is located in that portion of each of the raceways in which the balls directly contact the shaft upon which the bearing is mounted. U.S. Pat. No. 4,334,716 is directed towards a linear motion ball bearing of the "open type" in which the ball bearing cooperates with a shaft supported along its length. The ball retainer of the "open type" linear motion ball bearing is similar to that described in U.S. Pat. No. 3,545,826 except that it has a longitudinal section removed from its outer surface in order to accommodate the shaft support member.

Whenever a rotational force or torque is applied to such bearings, the bearings do not resist rotation about their shaft. However, in some applications even a small amount of rotation is undesirable. Resorting to the use of two parallel shafts as supports for the bearings may not be an acceptable solution because of the substantial difficulty in locating the shafts parallel to and accurately spaced from each other so as to enable the shafts and bearings to function properly together. More particularly, when linear motion ball bearings are used to support a moving work or support table, two parallel shafts are generally required to give the table stability. One of the installation problems includes mounting the shafts exactly parallel within close limits as well as having their centerlines accurately spaced apart. Many times, the user has difficulty in achieving the accuracy required. Accordingly, there is a need for shafts that are fixedly coupled together and which can support linear motion bearings.

One of the objects of this invention is to provide two pre-aligned and securedly coupled shafts thereby eliminating an installation problem. Another object is to provide two shafts fixed together, with or without spacers between them, so as to form a more rigid beam structure which is capable of resisting deflection when the shafts are supported at their ends.

Another object is to have two prealigned shafts coupled together with a special shaped spacer wherein the structure can be mounted on a flat surface thereby supporting the shafts along their full length instead of at the ends, in order to have even a more rigid support and better ability to resist deflection.

SUMMARY OF THE INVENTION

The apparatus of the present invention provides an improved linear motion bearing assembly which includes a pair of aligned shafts which are fixedly coupled together, as by welding, adhesives, fastening means and the like. The bearings in such an assembly may be of the anti-friction or plain bearing type and either roll or slide on the aligned shafts. In an illustrative application, an anti-friction first linear motion bearing is disposed upon one of the shafts. Such a linear motion bearing preferably has a first set of raceways that is formed in a first ball retainer which has a longitudinal section removed therefrom. A second anti-friction linear motion bearing is disposed on the other shaft. The second linear motion ball bearing also includes a second set of raceways and ball retainer having a longitudinal section removed therefrom. The raceways are substantially filled with balls and may include a load bearing plate. The aligned shafts may also have a spacer fastened between them.

BRIEF DESCRIPTION OF THE DRAWINGS

FIG. 3A is an elevational view of an alternate embodiment of the bearing assembly of the present invention;

FIG. 3B is a cross sectional view of the bearing assembly of FIG. 3A taken along line 3B—3B;

FIG. 4A is an elevational view of a further alternate embodiment of the bearing assembly of the present invention;

FIG. 4B is a cross sectional view of the bearing assembly of FIG. 4A taken along line 4B—4B;

DETAILED DESCRIPTION OF THE INVENTION

Figure 1:
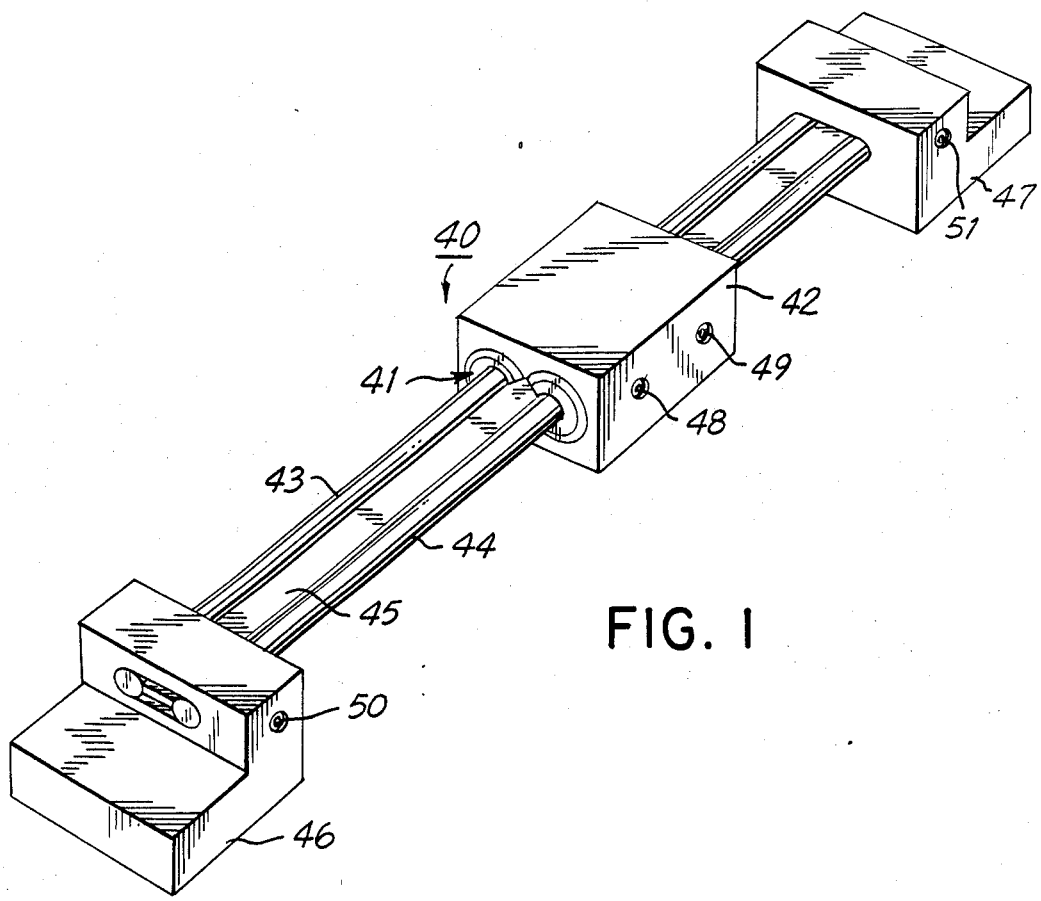
FIG. 1 is a perspective view of a representative application of the apparatus of the present invention.

Referring now to FIG. 1, the device 40 includes a bearing assembly 41 disposed within a pillow block 42 having a bore formed therein for the bearing assembly 41 and a pair of aligned shafts 43, 44. The bearing assembly 41 is preferably retained within the bore of the pillow block 42 by screws 48, 49 threaded into the pillow block. The shafts 43, 44 may be joined together as by spacer 45 as hereinafter described in greater detail. The ends of the shafts 43, 44 are mounted in support members 46, 47, and preferably retained by screws 50, 51 respectively.

The device 40 illustrated in FIG. 1 is merely a representative application of the present invention. Numerous other and different applications for the bearing and shafts of the present invention can be found in the machine tool industry. The device 40 is particularly well suited for applications in which linear motion of the pillow block 42 or some other member is desired and where the rotation of the pillow block 42 relative to the shafts is not desired.

It should also be understood that although the present invention is described in terms of an antifriction type linear motion ball bearing, any type of bearing capable of linear motion is adaptable for use in the present invention. Such other linear motion bearings could include simple ball bearings, sleeve type bearings of metal or plastic, or composition sleeve type bearing.

As will be appreciated by the workers in this art, the invention may be practiced using hardened pre-aligned shafts or shafts of softer metal depending on the bearing utilized. For example, anti-friction linear motion ball bearings should preferably be used with hardened shafting while the use of plain bearings will permit softer metal shafting to be utilized.

Figure 2B:
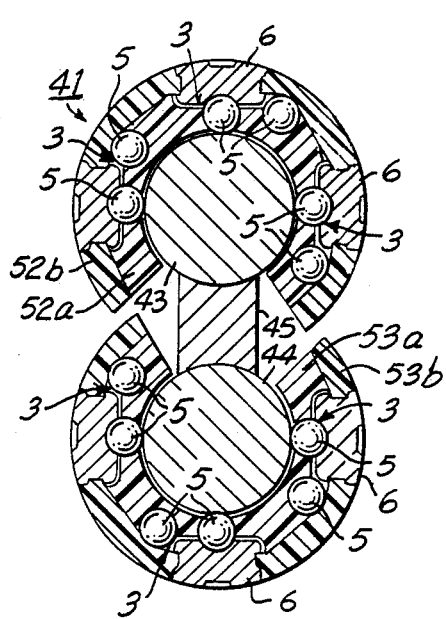
FIG. 2B is a cross-sectional view of the bearing assembly of FIG. 2A taken along lines 2B—2B.
Figure 2A:
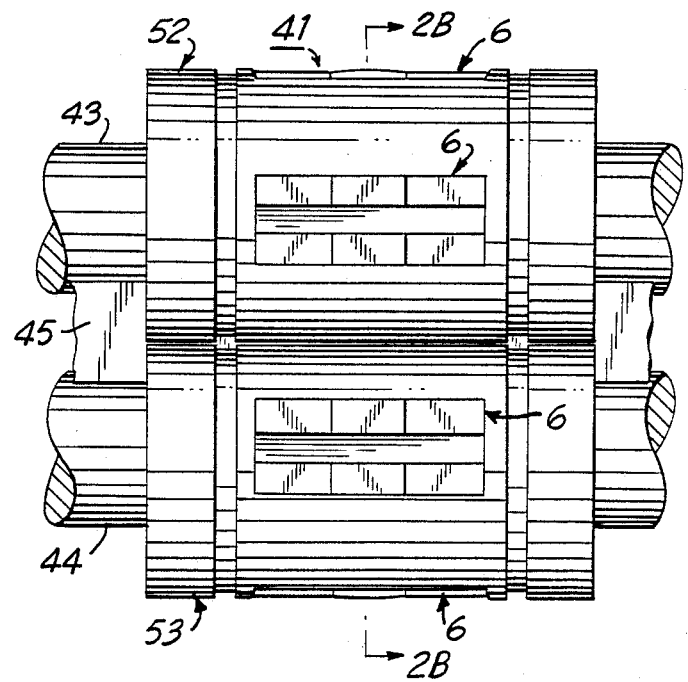
FIG. 2A is an elevational view of the bearing assembly of FIG. 1 disposed on a pair of aligned shafts fastened to a spacer and illustratively utilizing an anti-friction linear motion bearing.

Referring now to FIGS. 2A, 2B, it can be appreciated that in one illustrative embodiment of the present invention the bearing assembly 41 includes an anti-friction linear motion ball bearing having ball retainers 52,53 which surround shafts 43, 44 and have a plurality of generally oval-shaped raceways disposed beneath a load carrying plate 6. The shafts have a spacer 45 disposed between them.

As best seen in FIG. 2B, the ball retainers 52, 53 are preferably formed as two member units 52a, 52b and 53a, 53b from resilient non-metallic material. Examples of materials which have been found to operate entirely satisfactorily include Delrin or Nylon and it will be apparent that other moldable materials will operate satisfactorily. Advantageously, the material is selected so that the retainers 52, 53 may be produced by low cost, high speed, mass manufacturing methods, such as injection molding.

The first members 52a, 53a are generally cylindrical members having a longitudinal section removed therefrom and having the raceways 3 formed therein. The first members 52a, 53a, are fitted around the shafts 43, 44 with the spacer 45 disposed in the removed longitudinal section. The second members 52b, 53b are also generally cylindrical members which are fitted over the first members 52a, 53a.

Advantageously in this illustrative embodiment, the bottom of the straight, load-bearing portion of each raceway 3 is slotted so that the balls 5 may contact the shaft 43, the slot being somewhat narrower than the diameter of the balls. The slot terminates at each end of the straight portion whereupon the bottom is closed and is slightly inclined along the curved end portions of the raceway until it reaches the level of the bottom of the straight, load-free portion of the raceway. It will thus be seen that the balls 5 are in direct contact with both the shaft 43 and the load carrying plate 6 when in the straight load bearing portion of the raceway but have no contact with either the shaft 43 or the load carrying plate while in the curved or straight load free portions of the raceway.

In FIG. 2B, it can be appreciated that there are illustratively three raceways 3 and three load bearing plates 6 evenly distributed about each support shaft 43. 44. In this embodiment of the invention the spacer 45 joins the two shafts 43, 44 and the spacer 45 is disposed symmetrically between the removed longitudinal sections of retainers 52, 53. In this embodiment of the invention, both the shafts 43, 44 are working shafts with an equal number of raceways 3 disposed about each shaft.

The structural details of anti-friction linear motion ball bearings usable with this invention are well known to the workers skilled in the art and will not be discussed here Illustrative structures are shown in the patents hereinabove mentioned, and their respective disclosures are incorporated by reference herein. The details of other bearings capable of either rolling or sliding on a shaft such as plain bearings are also well known to workers in the art and need not be described herein.

An alternate embodiment of the present invention is illustrated in FIGS. 3A and 3B. In this illustrative embodiment of the invention, the ball retainer 52 includes three raceways 3 and three load-bearing plates 6 evenly disposed about the shaft 43, and the ball retainer 53 includes two raceways and two load-bearing plates 6 disposed about the shaft 44 The shaft 43 carries the majority of the load and the shaft 44 acts as an outrigger.

Referring now to FIGS. 4A and 4B, a further alternate embodiment of the present invention is illustrated. In this embodiment of the invention the shafts 43, 44 are coupled directly together without an intermediate spacer along a joint formed on the outer surfaces of the shafts. The ball retainers 52, 53 of this embodiment include four raceways 3 and four load bearing plates 6 which are disposed about the shafts 43, 44 respectively. The ball retainers 52, 53 are disposed in close proximity to one another. One end of each ball retainer 52, 53 extends into the removed longitudinal section of the opposing ball retainer. The shafts 43, 44 are working shafts and there are an equal number of raceways disposed about each shaft.

Figures 5A, 5B, 5C:
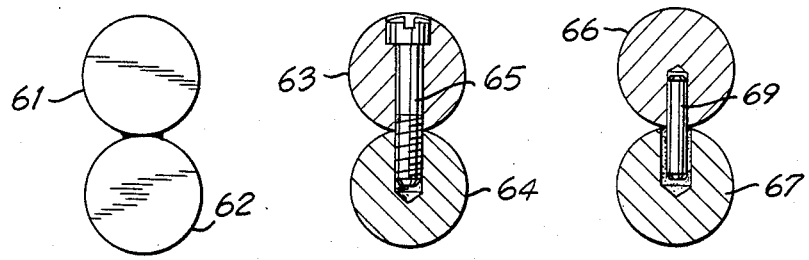
FIGS. 5A–5G are illustrations of various other methods for joining the shafts.
Figures 5D, 5E, 5F, 5G:
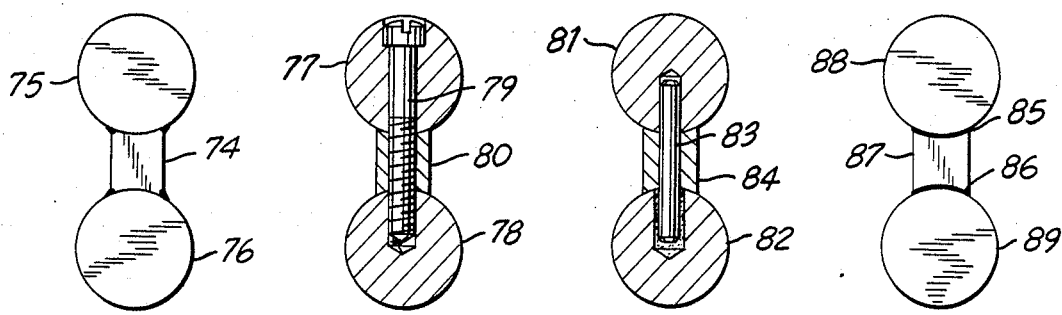

Referring now to FIGS. 5A to 5G, various other methods are illustrated for fastening two shafts together. In certain of these methods, the shafts are fastened together in a plurality of locations along a joint formed along the outer surfaces of the shafts. The shafts can also be coupled together with a continuous welding, brazing or cementing process. In FIG. 5A the shafts 61, 62 are illustrated as being welded, brazed or cemented together. In FIG. 5B the shafts 63, 64 are illustrated in cross section with a bolt 65 passing through the shaft 63 and being threaded into the shaft 64. The head of bolt 65 is countersunk into the shaft 63. In FIG. 5C the shafts 66, 67 are illustrated in cross section with a pin 69 cemented or pressed into a pair of holes formed in the shafts. In FIG. 5D the shaft 75 is illustrated as being welded or brazed to a spacer 74 which in turn is welded or brazed to a second shaft 76. In FIG. 5E the shafts 77, 78 are illustrated in cross section as being fastened together by a bolt 79 and a spacer 80. The bolt 79 passes through holes in the shaft 77 and spacer 80 and is threaded into the shaft 78. The head of bolt 79 is countersunk into the shaft 77. In FIG. 5F the shafts 81, 82 are illustrated in cross section as being fastened together by a pin 83 and a spacer 84. The pin 83 passes through a hole in the spacer 84 and is cemented or pressed into holes formed in the shafts 81,82. In FIG. 5G the shafts 88, 89 are illustrated as being cemented at joints 85, 86 to a spacer 87.

Figure 6:
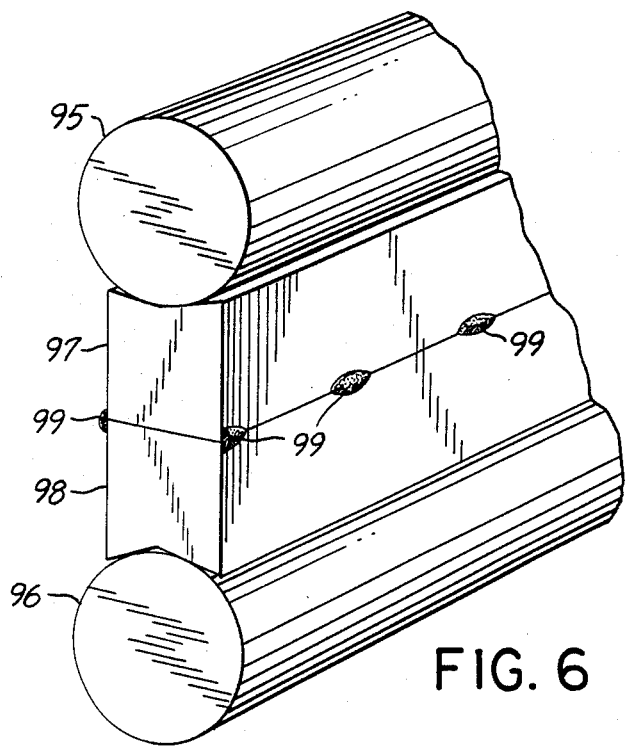
FIG. 6 is a partial perspective view of a pair of shaft supports spot welded together to form a common spacer.

Referring to FIG. 6, a perspective view of a pair of shafts 95, 96 is provided. The shafts 95, 96 are standard items having support members 97, 98 affixed respectively thereto. The support members 97, 98 can be spot welded together by welds 99 or alternatively can be continuously welded to form the spacer between shafts 95, 96.

Figure 7:
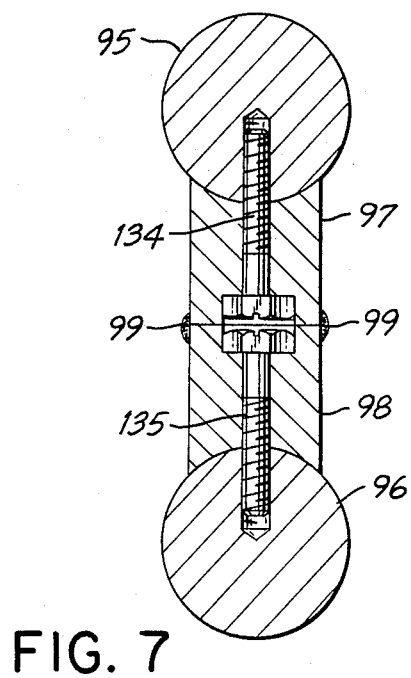
FIG. 7 is a cross sectional view of the shafts of FIG. 6.

Referring now to FIG. 7, a cross sectional view illustrates the pair of shafts 95, 96 which are joined to support members 97, 98 by machine screws 134, 135. The machine screws 134, 135 pass through the support members 97, 98 and are threaded into the shafts 95, 96. The support members 97, 98 are then welded together to form a pair of aligned shafts with a spacer therebetween.

Figure 8A:
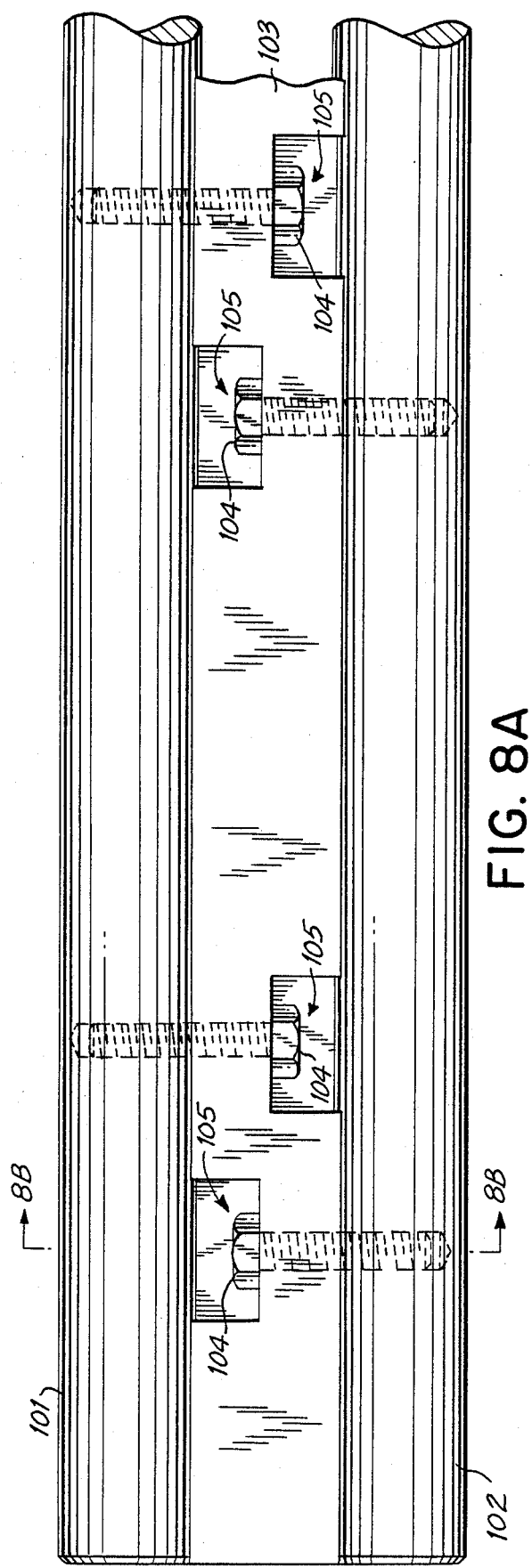
FIG. 8A is an illustration of a pair of support shafts joined by a common spacer and staggered bolts.
Figure 8B:
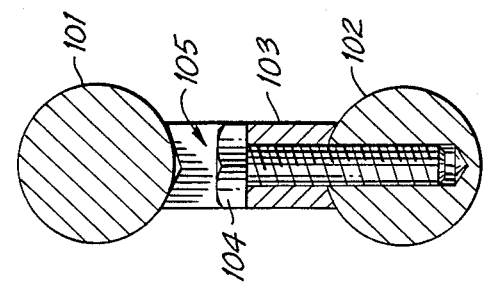
FIG. 8B is a cross sectional view of the shafts of FIG. 8A taken along line 8B—8B.

Referring now to FIGS. 8A and 8B, a partial elevational view and a cross sectional view of a pair of shafts 101, 102 are provided. The shafts 101, 102 are fastened together via a spacer 103 and a plurality of staggered bolts 104. The spacer 103 includes a plurality of rectangular apertures 105. The bolts 104 pass through holes formed in the spacer 103 at the rectangular apertures 105 and are then threaded into holes in the respective shafts 101, 102. The rectangular apertures 105 provide access to the bolts 104 and allow them to be securely seated, thereby providing a rigid support shaft assembly 101, 102, 103 without the necessity of welding as in FIGS. 6 or 7.

Figure 9:
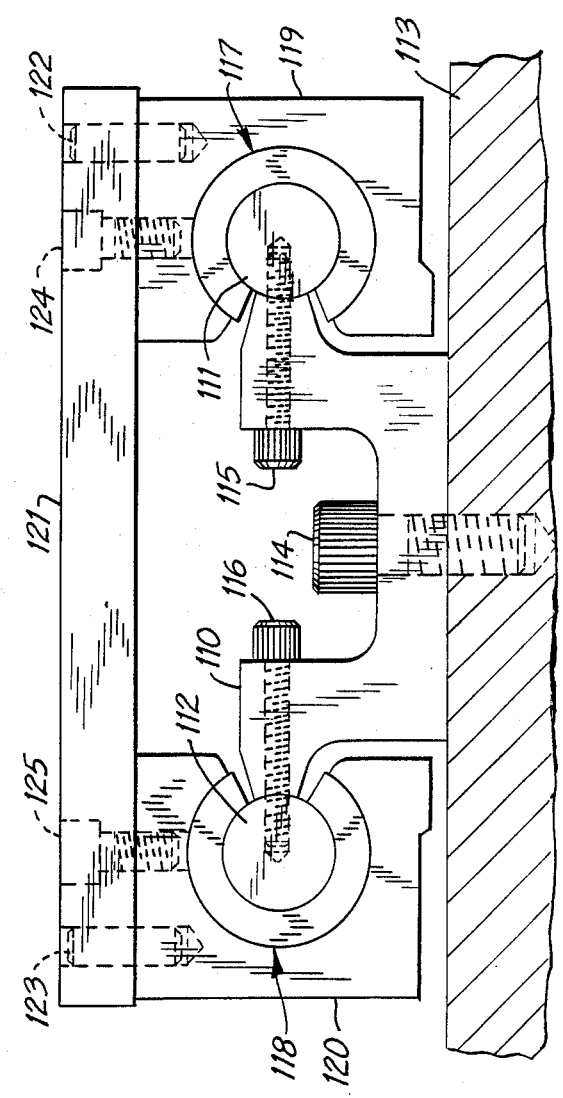
FIG. 9 is an end view of an alternate embodiment of the bearing assembly having a channel shaped spacer for fixedly the shafts.

Referring now to FIG. 9, an alternate embodiment of the bearing assembly includes a channel shaped spacer 110 for fixedly coupling shafts 111, 112 together, and which can be fastened to a flat base to rigidly support the shafts along their entire length thereby minimizing deflection. Preferably, the channel shaped spacer 110 is fastened to a base 113 by a bolt 114 and the shafts 111, 112 are fastened to the channel shaped spacer 110 by bolts 115, 116, respectively, or by any of the other means of attachment such as welding, brazing or cementing. Ball retainers 117, 118 of the open type which are described above are disposed about the shafts 111,112 and retained in blocks 119, 120. A horizontal platform or table 121 is secured to the blocks 119, 120. Preferably, the table 121 is secured by dowels 122, 123 and bolts 124, 125 which are threaded into the blocks 119, 120. The table 121 may be linearly displaced in a direction parallel to the aligned shafts 111, 112 which are fixedly coupled together.

Figure 10:
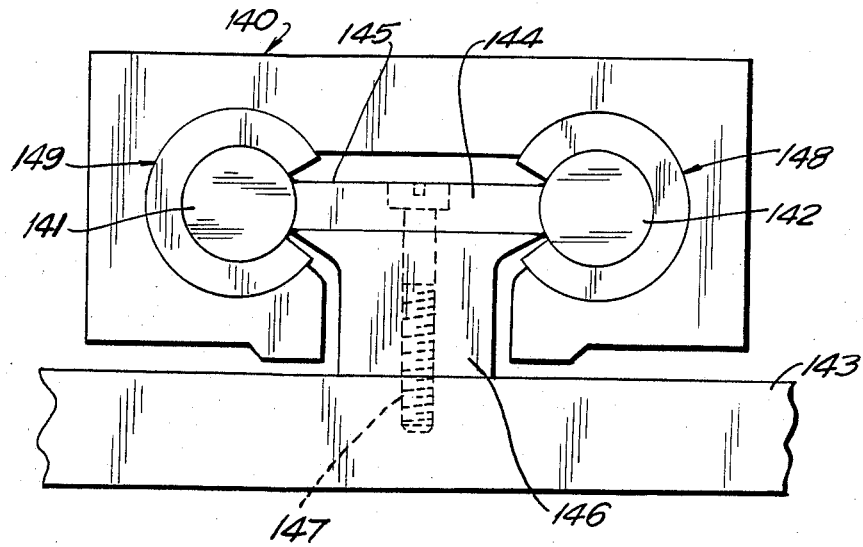
FIG. 10 is an end view of an alternate embodiment of the bearing assembly having a T shaped support member for fixedly coupling the shafts.

Referring now to FIG. 10, another alternate embodiment of the present invention enables a pair of shafts 141, 142 to be attached to a base 143 along their entire length. This alternate embodiment includes a web or support member 144 which is generally T shaped or otherwise suitably shaped. The web or support member 144 is more compact than the channel 110 of FIG. 9 and is less susceptible to deflections caused by the loads on shafts 141, 142.

The support member 144 may be a unitary member or may be made from a horizontal member 145 and a vertical member 146 as illustrated in FIG. 10. The support member 144 runs parallel to the shafts 141, 142 and provides support along their entire length. This arrangement is particularly advantageous when there are heavy loads which might otherwise cause some deflection in the shafts 141, 142. The horizontal member 145 may be attached to the shafts 141, 142 by welds or by any of the methods described above, such as by cement or screws. The horizontal member 145 is preferably attached to the vertical member 146 and the base 143 by a plurality of bolts 147. The bottom of bolt 147 is threaded into base 143 and the top is countersunk into the horizontal member 145. The shafts 141, 142 are disposed within the bearings 149, 159 of the housing 140.

Figure 10A:
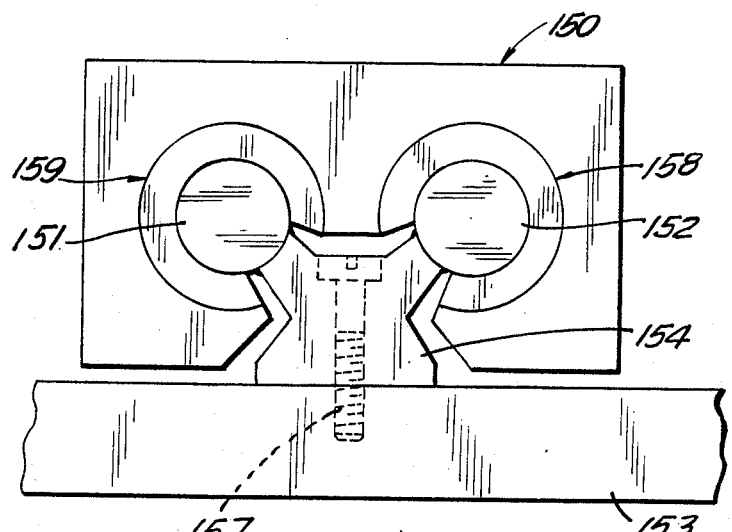
FIG. 10A is an end view of an alternate embodiment of the bearing assembly having a unitary support member with a relatively wide stance for fixedly coupling the shafts.

Referring now to FIG. 10A, another alternate embodiment of the invention includes a unitary support member 154 that is preferably welded to shafts 151, 152. The unitary support member 154 has a relatively wide stance and runs parallel to the shafts 151, 152 to provide support along their entire length. The unitary support member is preferably affixed to a base 153 by a plurality of bolts 157. The bolts 157 extend through the unitary support member 154 and are threaded into the base 153. The unitary support member 154 is relatively compact and is capable of supporting the shafts 151, 152 in close proximity. The shafts 151, 152 are disposed within the bearings 158, 159 and the housing 150.

In addition to the embodiments illustrated in FIGS. 10 and 10A, there are numerous other arrangements for supporting a pair of aligned shafts upon a base with either a unitary support member or a two piece member disposed along the entire length of the shafts. The embodiments of FIGS. 10 and 10A should be deemed representative examples of other and different arrangements embraced by the embodiments of thoses two FIGS.

While the invention has been described in terms of its preferred embodiments, the words used are words of description rather than limitation and other embodiments of the invention may be encompassed within the scope of the appended claims without departing from the true scope and spirit of the invention in its broader aspects.

What is claimed:

1. A linear motion bearing and shaft assembly for axial movement which comprises:
    a first round support shaft;
    a second round support shaft with its axis parallel to the axis of said first support shaft, rigidly secured together with said first support shaft, said first and second support shafts being independently end supported to allow unrestricted axial movement along their lengths;
    a first linear motion open-type recirculating bearing disposed on said first shaft for axial movement thereon; and
    a second linear motion open-type recirculating bearing disposed on said second shaft for axial movement thereon, the openings of said first and second open-type bearings substantially facing each other and wherein said first and second support shafts are rigidly secured together by means including structure which is disposed between said first and second shafts, said structure contacting both support shafts and laterally symmetrical in shape with regard to a plane passing through the axes of said shafts;
    and whereby said means maintains the assembly in torsional balance when subject to uneven or opposing forces.

2. An apparatus according to claim 1 wherein said structure securely first and second shafts includes welding, cementing or brazing of a joint along the outer surfaces of said first and second shafts.

3. An apparatus according to claim 1 wherein said structure joining said first and second shafts includes a plurality of bolts, said bolts being threaded into at least one shaft and having their heads countersunk into a shaft.

4. An apparatus according to claim 1, wherein said structure lowering said first and second shafts includes a plurality of pins cemented or pressed into holes formed in said first and second shafts.

5. An apparatus according to claim 2, 3 or 4 wherein said first and second linear motion bearings are anti-friction bearings which include corresponding first and second sets of raceways, said first and second linear motion bearings have a longitudinal sector removed therefrom, said first and second sets of raceways being substantially filled with balls, and the number of raceways in said first set of raceways is equal to the number of raceways in said second set of raceways.

6. An apparatus according to claim 2, 3 or 4 wherein said first and second linear motion bearings are anti-friction bearings which include corresponding first and second sets of raceways, said first and second linear motion bearings having a longitudinal sector removed therefrom, said first and second sets of raceways being substantially filled with balls, and the numbers of raceways in said first set of raceways is unequal to the number of raceways in said second set of raceways.

7. An apparatus according to claim 2, 3 or 4 wherein said first and second linear motion bearings are anti-friction bearings which include first and second sets of race was substantially filed with balls, said bearings, having longitudinal sectors thereof removed, the end of each of said sets of raceways extending into the removed longitudinal section of the other set of raceways.

8. An apparatus according to claim 1 wherein said structure includes a spacer spot welded or brazed to said first and second shafts.

9. An apparatus according to claim 1 wherein said structure includes a spacer continuously welded or brazed to said first and second shafts.

10. An apparatus according to claim 1 wherein said structure includes a spacer bolted to said first and second shafts by a plurality of bolts, said bolts pass through said spacer and are threaded into at least one shaft and have their heads countersunk in a shaft.

11. An apparatus according to claim 1 wherein said structure includes a spacer is fastened to said first and second shafts by a plurality of pins which pass through said spacer and are cemented or pressed into holes formed in said first and second shafts.

12. An apparatus according to claim 1 wherein said structure includes a spacer cemented to said first and second shaft.

13. An apparatus according to claim 1 wherein said structure including a spacer including a plurality of apertures and bolts pass through said spacer at the apertures to secure said first and second shafts to said spacer.

14. An apparatus according to claim 1, 8, 9, 10, 11, 12 or 13 wherein said first and second linear motion bearings are anti-friction bearings which include corresponding first and second sets of raceways, said first and second linear motion bearings having a longitudinal sector removed therefrom, said first and second sets of raceways being substantially filled with balls, and the number of raceways in said first set of raceways is equal to the number of raceways in said second set of raceways.

15. An apparatus according to claim 1, 8, 9, 10, 11, 12 or 13 wherein said first and second linear motion bearings are anti-friction bearings which include corresponding first and second sets of raceways, said first and second linear motion bearings having a longitudinal sector removed therefrom, said first and second sets of raceways being substantially filled with balls, and the number of raceways in said first set of raceways is unequal to the number of raceways in said second set of raceways.

16. An apparatus according to claim 1, 8, 9, 10, 11, 12, or 13 wherein said first and second linear motion bearings are anti-friction bearings which include first and second sets of raceways, substantially filled with balls, said bearings having longitudinal sectors thereof removed, the end of each of said sets of raceways extending into the removed longitudinal section of the other set of raceways.

17. An apparatus according to claim 1 wherein said first and second linear motion bearings are disposed in the bore of a pillow block.

18. An apparatus according to claim 1 wherein said first and second shafts are secured together by structure comprising a spacer between said first and second shafts, and said first and second linear motion bearings are disposed in blocks which are connected to a movable table.

19. An apparatus according to claim 1 wherein said first and second shafts are secured together by a support member disposed between the shafts for supporting the shafts along their entire length when attached to a rigid structure.

20. An apparatus according to claim 19 wherein said support member includes a first portion coupled to said shafts and a second portion which supports the first portion.

21. An apparatus according to claim 20 wherein the support member is a two piece member.

22. An apparatus according to claim 19 wherein the support member is a unitary member.

23. An apparatus according to claim 19 wherein the support member is a two piece member.

* * * * *